(12) United States Patent  (10) Patent No.: US 7,501,789 B2
O'Donoghue  (45) Date of Patent: Mar. 10, 2009

(54) SOLAR POWERED BATTERY CHARGER WITH VOLTAGE REGULATION CIRCUIT APPARATUS AND METHOD

(75) Inventor: Sean O'Donoghue, Quebec (CA)

(73) Assignee: ICP Global Technologies, Inc., Quebec (CA)

( * ) Notice: Subject to any disclaimer, the term of this patent is extended or adjusted under 35 U.S.C. 154(b) by 0 days.

(21) Appl. No.: 11/298,663

(22) Filed: Dec. 12, 2005
(Under 37 CFR 1.47)

(65) Prior Publication Data
US 2006/0267543 A1  Nov. 30, 2006

Related U.S. Application Data

(60) Provisional application No. 60/634,551, filed on Dec. 10, 2004.

(51) Int. Cl.
*H01M 10/46* (2006.01)
*H02J 7/00* (2006.01)
*H02J 7/04* (2006.01)

(52) U.S. Cl. .............. 320/101; 320/102; 320/103; 320/104; 320/153; 320/162

(58) Field of Classification Search ........... 320/101, 320/104, 162, 102, 153, 103
See application file for complete search history.

(56) References Cited

U.S. PATENT DOCUMENTS

| 4,453,119 | A | * | 6/1984 | Staler et al. ............. 320/102 |
| 5,221,891 | A | * | 6/1993 | Janda et al. ............. 323/350 |
| 6,046,570 | A | * | 4/2000 | Gabbai et al. ............. 320/101 |
| 2006/0028166 | A1 | * | 2/2006 | Closset et al. ............. 320/101 |
| 2006/0073044 | A1 | * | 4/2006 | Lui ............. 417/423.14 |

* cited by examiner

*Primary Examiner*—Akm E Ullah
*Assistant Examiner*—Johali A Torres Ruiz
(74) *Attorney, Agent, or Firm*—Rader, Fishman & Grauer, PLLC

(57) ABSTRACT

The present invention relates to a solar powered battery charger with voltage regulation circuit and the method for recharging a car battery. The charger comprises an input port for receiving electrical power from a solar panel; an output port for providing electrical power to a battery; and a power regulation circuit electrically coupled to the input power. The power regulation circuit is electrically coupled to the output port and for monitoring a voltage thereon, having a first state in which electrical power is provided to the output port and a second state in which electrical power is not provided to the output port. The power regulation circuit remains in a first state when the voltage at the output port is below a threshold voltage and for other than remaining in the first state when the voltage at the output port is above the threshold voltage.

15 Claims, 3 Drawing Sheets

SOLAR POWERED BATTERY CHARGER WITH VOLTAGE REGULATION CIRCUIT APPARATUS AND METHOD

This application claims the benefit of U.S. Provisional application No. 60/634,551, which was filed on Dec. 10, 2004.

FIELD OF THE INVENTION

The present invention relates to a solar powered battery charger with voltage regulation circuit apparatus and method.

BACKGROUND OF THE INVENTION

Car batteries are prone to self discharge and also since there are onboard electronics that work even when the car is stopped (maybe 70 milli-amps), batteries that are left in cars that are not used will discharge after long periods.

The typical consequence of this is that after prolonged periods of non-use, a car will not start. In an extreme case the uncharged battery will sulfate irremediably. Recycling dead batteries also wastes energy and is detrimental to the environment. Though some damaged batteries will still start cars, typically, these require changing after a short period of use. This last case is quite costly for car manufacturers whose cars may not be started several months between the time they leave a manufacturing plant and a time they are purchased by a consumer.

It is not practical to have automotive employees starting cars, periodically, though even this does not completely solve the problem since some car batteries have to be run a long time and at high revolution to charge properly.

Disconnecting the battery only partially addresses the problem since it does not prevent self-discharge. Additionally, it brings new problems as some electronics will reset themselves and will need reprogramming. Further, it is very likely that the battery will later be reconnected which involves some labor.

Some prior art systems teach connecting a solar panel across the battery that was sized so as to compensate for the energy loss. This improves the situation but has a major shortcoming. Sunlight and battery drain conditions vary dramatically so in a number of cases the panel overcharges the battery. Overcharging of batteries is also destructive. If the panel is made small to not overcharge some batteries, then it may not properly charge others when subject to different conditions.

SUMMARY OF THE INVENTION

According to one aspect of the invention, it provides a battery charger comprising: an input port for receiving electrical power from a solar panel; an output port for providing electrical power to a battery; and a power regulation circuit electrically coupled to the input port, the power regulation circuit electrically coupled to the output port and for monitoring a voltage thereon, the power regulation circuit having a first state in which electrical power is provided to the output port and a second state in which electrical power is not provided to the output port, the power regulation circuit for remaining in a first state when the voltage at the output port is below a threshold voltage and for remaining in the second state when the voltage at the output port is above the threshold voltage.

According to the other aspect of the invention, it provides a method of recharging a car battery comprising the steps of: receiving electrical power from a photovoltaic cell; monitoring a voltage from the car battery using a power regulation circuit, the voltage indicative of a level of charge of the car battery; and providing the received electrical power through the power regulation circuit to the car battery in dependence upon the monitored voltage.

According to yet another aspect of the invention, it provides a solar panel comprising: a photovoltaic cell; a frame mechanically coupled to the photovoltaic cell; and a shock absorbing member having a first portion fixedly coupled to one of the frame and the photovoltaic cell, and a second other portion for mechanically coupling to a vehicle, the shock absorbing member for reducing the intensity of mechanical shocks imparted to the photovoltaic cell.

BRIEF DESCRIPTION OF THE DRAWINGS

The invention is now described with reference to the drawings in which.

DETAILED DESCRIPTION OF THE INVENTION

In order to overcome the limitations of the prior art, a system according to the invention comprises an electronic circuit designed to couple to a photovoltaic cell and an electrical connection of a car. The electronic circuit acts to monitor a level of charge in the battery and supply power to the battery when the level of charge of the battery is below a threshold.

Figure 1:
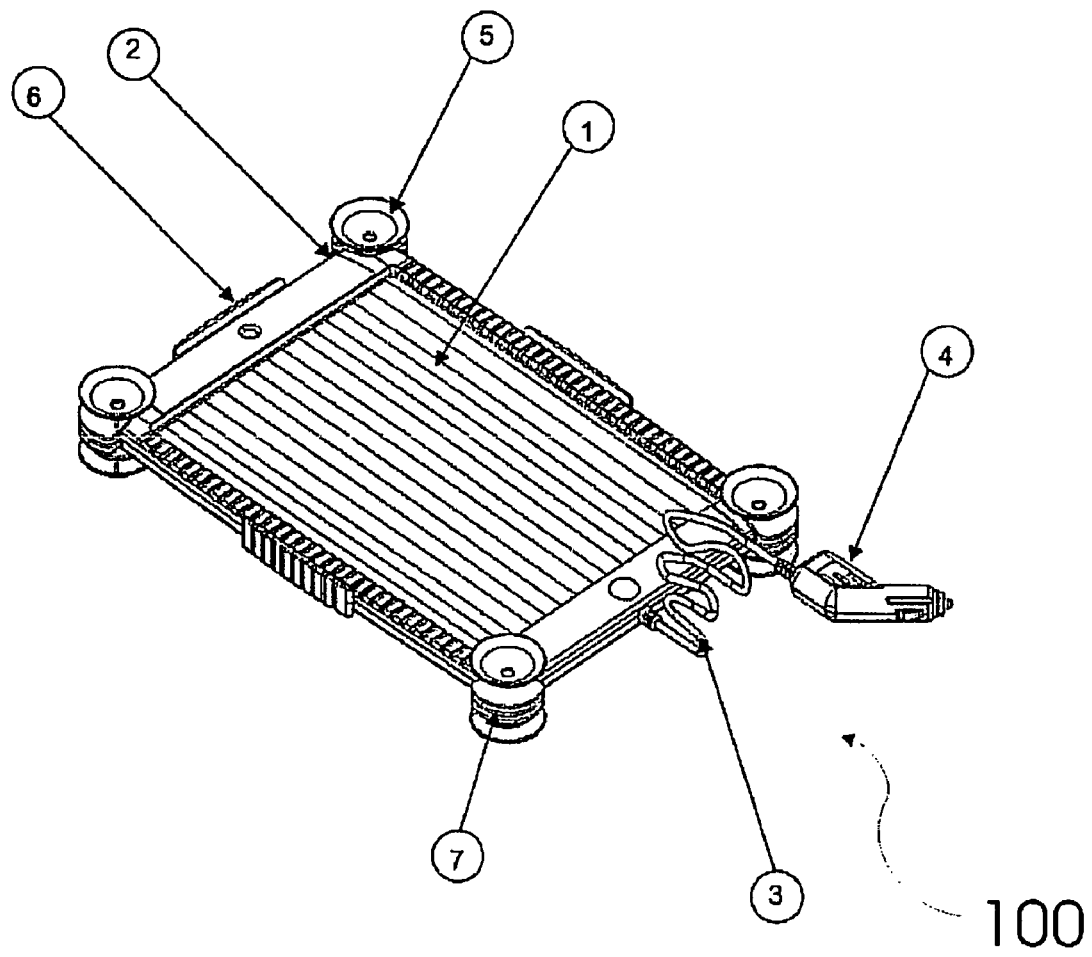
FIG. 1 is a perspective view of the battery charger according to a preferred embodiment of the present invention.

Referring to FIG. 1, a preferred embodiment of the invention is shown. The charger 100 comprises a solar panel 1 enclosed in a suitable frame 2 for support and protection. The solar panel converts light from ambient light sources, such as the sun, into electrical energy that is transmitted through the wire 3 to a male car cigarette lighter adaptor (CLA) 4. It is suggested that the solar panel be placed in each car resting on a dashboard cushioned by suction cups 5. The suction cups 5 are designed to prevent the frame 2 from slipping, for example when the vehicle is being moved on a ship or a train. The same suction cups 5 are optionally used to place the charger in a window, such as affixed to a windshield of the car. The suction cups are optionally fairly large and soft so as to absorb shock should the unit be dropped. As shown, in this embodiment the suction cups 5 comprise ridges 7 that are intended to protect the panel against shock should it be dropped or in the case of a car collision.

Additional shock absorbing devices are optionally provided. The preferred embodiment of the invention is shown having rubber bumpers 6 attached to the frame to absorb external shocks. The rubber bumpers 6 and the ridges 7 are important to the preferred embodiment of the invention since they help to partially mechanically isolate the fragile solar panel from large shock loads, such as a car collision. Making the charger 100 more robust allows the solar charger 100 to be safely used in cars where safety standards are high and require anti-breakage or anti-shattering features for their accessories.

The charger according to the preferred embodiment of the invention comprises an electrical circuit (not shown) that is designed to prevent overcharging of a car battery when the charger is electrically coupled to the electrical system of a car. This circuit acts to prevent an overcharging of a standard car battery and thereby avoids limitations of the prior art solar battery rechargers for cars.

Figure 2:
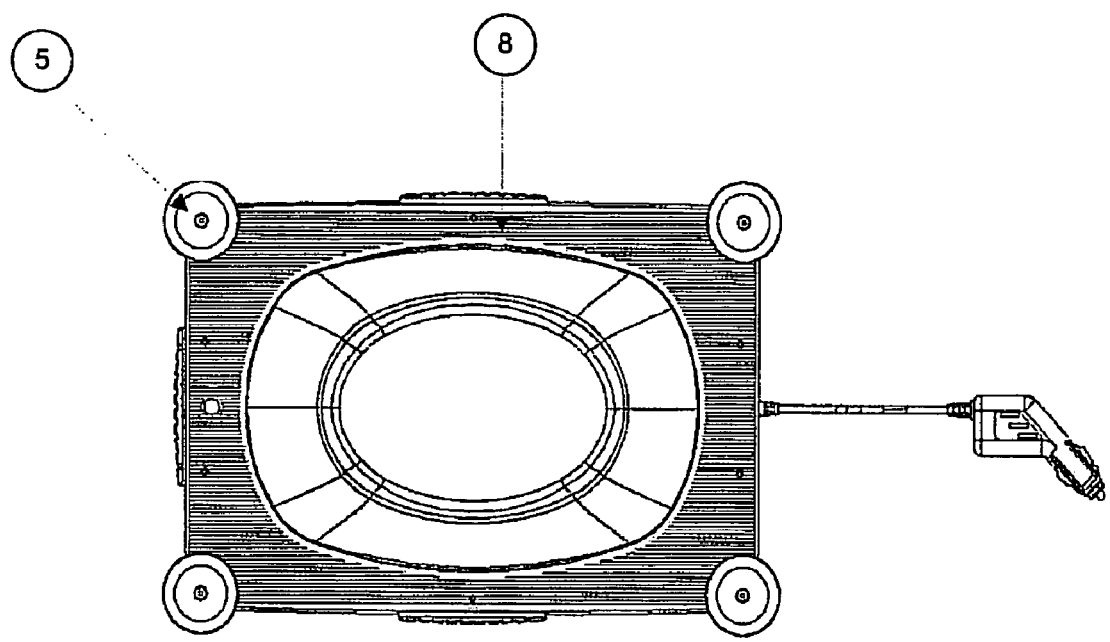
FIG. 2 is a bottom view of the battery charger according to the preferred embodiment of the present invention.

Referring to FIG. 2, a bottom view of the preferred embodiment of the invention is shown. This view clearly shows the suction cups 5 that support the panel adhering to a surface from the bottom side. The bottom side protects the fragile solar panel 1 by the addition of a plastic rear piece 8.

Figure 3:
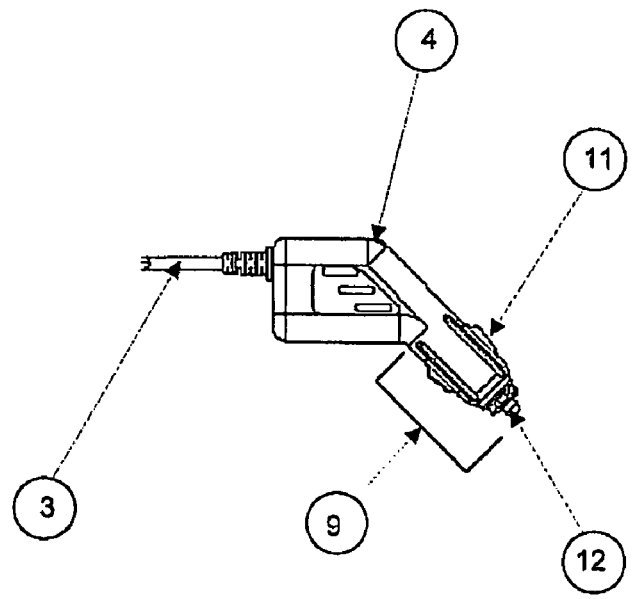
FIG. 3 is an enlarged view of the cigarette lighter adapter of the battery charger according to the preferred embodiment of the present invention; and, FIG. 4 is an electrical circuit designed to prevent an overcharging of a car battery and is consistent with a protection circuit according to the preferred embodiment of the present invention.

Referring to FIG. 3, a close up view of the CLA 4 according to the preferred embodiment of the invention is shown. The CLA 4 comprises electronics and connectors that support and provide a regulated power supply to the car battery. The wire 3 is coupled to the solar panel 1. The output end 9 is designed to fit into the female receptacle of a car CLA plug and comprises of negative contacts 11 and a positive contact 12.

Figure 4:
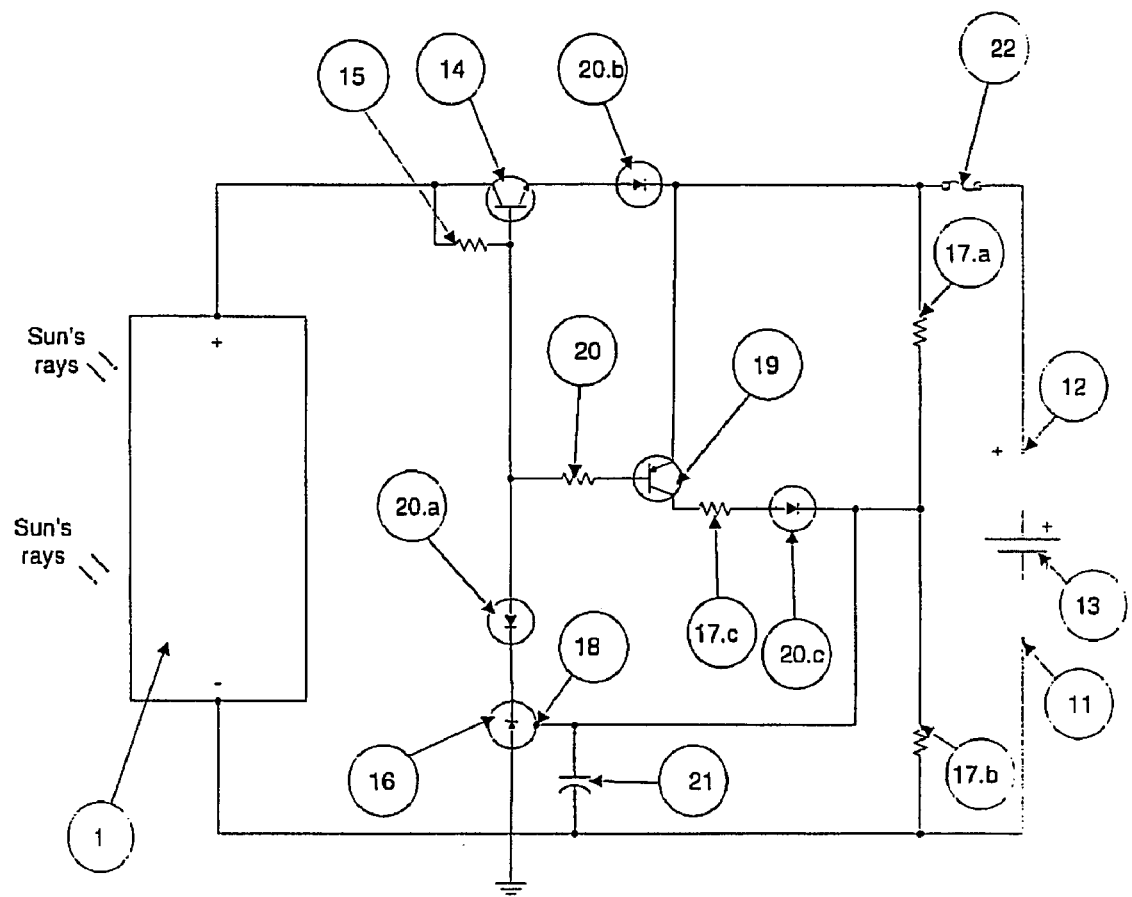

Referring to FIG. 4, a circuit diagram of a power regulation circuit or an electrical circuit intended to prevent overcharging of a car battery is shown. The circuit shown in FIG. 4 is optionally incorporated within the CLA 4 of the preferred embodiment of the invention. The circuit is designed to receive electrical energy from the solar panel 1 and its output current is provided to the car battery 13 via negative contact 11 and positive contact 12. Power to the car battery goes through power transistor 14. When the transistor is biased to an "on" state or first state, current passes through protection diode 20.b and is allowed to go from the solar panel 1 to the battery 13. Collector-base resistor 15 serves to provide limited current into a base of power transistor 14 for operation and also sets current for operation of the comparator/switch IC 16. The comparator/switch IC 16 has an internal voltage reference. The battery voltage is fed back into the circuit through voltage divider resistors 17.a, 17.b and 17.c at node 18. If this voltage is lower than the internal reference voltage, the comparator/switch IC 16 is in the off position and the power resistor 14 is biased to the "on" state by the current available from the solar panel 1 through collector-base resistor 15. If the battery voltage fed back at point 18 is higher than the internal reference voltage, the comparator/switch IC 16 is in the on position and the power transistor 14 is biased to an "off" state or second state in which current is no longer allowed to flow from the solar panel 1 into the battery 13.

When the comparator/switch IC 16 is in the "on" position, the resume charge switch transistor 19 is biased to an "on" state with the current that flows through base resistor 20. This effectively puts voltage divider resistor 17.c in parallel with voltage divider resistor 17.a, thus modifying the total resistor ratio with voltage divider resistor 17.b. This modifies the voltage fed back from the battery 13 to node 18 making it higher. To turn the comparator/switch IC 16 back into the "off" position, the battery discharges down to a lower voltage than what was needed to turn the switch to the "on" state. In this way, a hysterisis window is created between battery charge cut off threshold and resume charge cut threshold in voltages. The cut in voltage is lower than the cut out voltage. Protection diodes 20.a, 20.b and 20.c and stability capacitor 21 and fuse 22 complete the circuit.

Optionally, a predetermined function (not shown) may be incorporated with the power regulation circuit and may generate an output voltage to be compared with the internal reference voltage. Additionally, a temperature monitoring circuit (not shown) for monitoring temperature (i.e. monitoring the battery temperature) and providing temperature data may be integrally combined or in communication with the predetermined function, thus the output of the predetermined function may vary accordingly with change in temperature data. Therefore, an "on" or "off" state of the power regulation circuit may be determined based on both the voltage state of the battery and temperature data.

Numerous other embodiments of the invention will be apparent to one of skill in the art without departing from the spirit or scope of the invention, For example, a person of skill in the art will appreciate that a wide variety of rechargeable batteries are optionally recharged using a system and method consistent with the invention.

What is claimed is:

1. A solar powered battery charger comprising:
   an input port for receiving electrical power from a solar panel;
   an output port for providing electrical power to a battery; and
   a power regulation circuit, electrically coupled to the input port and the output port, for regulating electrical power therebetween, the power regulation circuit comprises:
      a power transistor for operably connecting or disconnecting the input port and the output port,
      a collector base resistor connecting the input port to the base of the power transistor for receiving a portion of the input current for operating the power transistor;
      a protection diode connected in series with the power transistor for allowing said input current to flow from the input port to the output port;
      a resume charge switch;
      voltage divider resistors for dividing the output port voltage, having a first ratio for raising the divided output port voltage and a second ratio for lowering the divided output port voltage, selected by said resume charge switch:
      a comparator for continuously comparing said divided output port voltage with a threshold voltage;
      when said divided output port voltage is lower than the threshold voltage, the comparator causes the portion of the input current to flow through the collector base resistor for allowing the portion of the input current to bias the power transistor to connect the input port and the output port via the protection diode while the protection diode prevents discharging from the battery, and further causing the resume charge switch transistor to select said first ratio, and
      when said divided output port voltage is higher than the threshold voltage, the comparator prevents the portion of the input current to flow through the collector base resistor, causing the power transistor to disconnect the input port and output port for preventing overcharging of the battery, and further causes the resume charge switch to select said second ratio for thus creating a hysteresis window for said comparing.

2. A solar powered battery charger according to claim 1, wherein the solar panel comprising a photovoltaic cell electrically coupled to the input port and a frame for structurally supporting the photovoltaic battery.

3. A solar powered battery charger according to claim 2 further comprising:
   an adapter for electrically coupling to a cigarette lighter interface of a car, the adapter electrically coupled to the output port.

4. A solar powered battery charger according to claim 3 further comprising at least a mechanical shock absorbing component disposed proximate the solar panel and for reducing the intensity of mechanical shocks thereto.

5. A solar powered battery charger according to claim 4 wherein the mechanical shock absorbing component comprises suction cups.

6. A solar powered battery charger according to claim 4 wherein the mechanical shock absorbing component comprises rubber bumpers.

7. A solar powered battery charger according to claim 1 wherein the threshold voltage is compared continuously with an output of a predetermined function.

8. A solar powered battery charger according to claim 7 further comprising a temperature monitoring circuit for providing temperature data, wherein the temperature monitoring circuit is in communication with a predetermined function and wherein the output of predetermined function in dependence upon the temperature data and the voltage.

9. A method of recharging a car battery comprising the steps of:
   receiving electrical power from a photovoltaic cell;
   comparing continuously a voltage from the car battery with a threshold voltage using a power regulation circuit, the voltage indicative of a level of charge of the car battery and is divided by a first ratio for raising the voltage or a second ratio for lowering the voltage; and
   when the voltage is below the threshold voltage, causing the first ratio to be selected for raising the voltage, providing the received electrical power through the power regulation circuit to the car battery while preventing discharge from the car battery,
   when the voltage is above the threshold voltage, causing the second ratio to be selected for lowering the voltage for creating a hysteresis window, and preventing the received electrical power to the car battery.

10. A method of recharging a car battery according to claim 9, wherein the monitoring voltage further comprising output of a predetermined function, wherein the predetermined function is in communication with a temperature monitoring circuit for providing a temperature data.

11. A solar panel comprising:
    a photovoltaic cell;
    a frame mechanically coupled to the photovoltaic cell;
    a shock absorbing member having a first portion fixedly coupled to one of the frame and the photovoltaic cell, and a second other portion for mechanically coupling to a vehicle, the shock absorbing member for reducing the intensity of mechanical shocks imparted to the photovoltaic cell; and
    a power regulation circuit electrically coupled to the photovoltaic cell for regulating electrical power therefrom, comprising
    a power transistor for operably connecting or disconnecting the input port and the output port,
    a collector base resistor connecting the input port to the base of the power transistor for receiving a portion of the input current for operating the power transistor;
    a protection diode connected in series with the power transistor for allowing said input current to flow from the input port to the output port;
    a resume charge switch;
    voltage divider resistors for dividing the output port voltage, having a first ratio for raising the divided output port voltage and a second ratio for lowering the divided output port voltage, selected by said resume charge switch;
    a comparator for comparing said divided output port voltage with a threshold voltage:
    when said divided output port voltage is lower than the threshold voltage, the comparator causes the portion of the input current to flow through the collector base resistor for allowing the portion of the input current to bias the power transistor to connect the input port and the output port via the protection diode while the protection diode prevents discharging from the battery, and further causing the resume charge switch transistor to select said first ratio, and
    when said divided output port voltage is higher than the threshold voltage, the comparator prevents the portion of the input current to flow through the collector base resistor, causing the power transistor to disconnect the input port and output port for preventing overcharging of the battery, and further causes the resume charge switch to select said second ratio for thus creating a hysteresis window for said comparing.

12. A solar panel according to claim 11 wherein the shock absorbing member is a suction cup.

13. A solar panel according to claim 11 wherein the shock absorbing member is a bumper.

14. A solar panel according to claim 11 wherein the threshold voltage is compared with an output of a predetermined function.

15. A solar panel according to claim 14 further comprising a temperature monitoring circuit for providing temperature data, the temperature monitoring circuit in communication with the predetermined function and an output of the predetermined function varies in response to the temperature data.

* * * * *